US006890180B2

(12) United States Patent
Sterns et al.

(10) Patent No.: US 6,890,180 B2
(45) Date of Patent: May 10, 2005

(54) PHONETIC TRANSLITERATION CARD DISPLAY

(75) Inventors: Ronni S. Sterns, Akron, OH (US); Harvey L. Sterns, Akron, OH (US); Anthony Sterns, Akron, OH (US); Charles A. Nelson, Akron, OH (US); Vincent Antenucci, Wadsworth, OH (US); Cameron J. Camp, III, Solon, OH (US); Kent W. Murphy, Wooster, OH (US)

(73) Assignee: Creative Action LLC, Akron, OH (US)

( * ) Notice: Subject to any disclaimer, the term of this patent is extended or adjusted under 35 U.S.C. 154(b) by 0 days.

(21) Appl. No.: 10/646,311

(22) Filed: Aug. 22, 2003

(65) Prior Publication Data

US 2004/0053202 A1 Mar. 18, 2004

Related U.S. Application Data

(63) Continuation of application No. 09/663,329, filed on Sep. 18, 2000.

(51) Int. Cl.$^7$ ................................................ G09B 19/08
(52) U.S. Cl. ..................................... 434/157; 434/156
(58) Field of Search ................................ 434/156, 157, 434/170, 172, 408, 421, 428, 429, 430; 40/124.04, 447, 449, 453, 489, 490, 600, 605, 611, 618

(56) References Cited

U.S. PATENT DOCUMENTS

| | | |
|---|---|---|
| 1,480,606 A | 1/1924 | Fetters |
| 2,929,160 A | 3/1960 | Lyttle |
| 3,081,560 A | 3/1963 | Agud |
| 3,154,870 A | 11/1964 | Hopp et al. |
| 3,543,419 A | 12/1970 | Santini |
| 3,728,800 A | 4/1973 | Magram |
| 3,740,879 A | 6/1973 | Patterson |
| 3,778,915 A | 12/1973 | Freeman et al. |
| 3,885,326 A | 5/1975 | Robinson et al. |
| 3,943,640 A | 3/1976 | Fritsch et al. |
| 4,035,940 A | 7/1977 | Mickey et al. |
| 4,059,914 A | 11/1977 | Dobson |
| 4,353,700 A | 10/1982 | Volakakis |

(Continued)

FOREIGN PATENT DOCUMENTS

| | | |
|---|---|---|
| DE | 3643541 A1 | 6/1988 |
| GB | 1578649 | 11/1980 |

OTHER PUBLICATIONS

C.Camp, The InterpreCare System: Overcoming Language Barriers in Long–Term Care, The Gerontologist, vol. 36, No. 6, pp. 321–323 (1996).

*Primary Examiner*—Kurt Fernstrom
(74) *Attorney, Agent, or Firm*—Rankin, Hill, Porter & Clark, LLP

(57) ABSTRACT

A phonetic transliteration card display includes a display board to which a plurality of display cards can be secured removably. The card display enables a person who speaks a first language, but not a second language, to speak simple phrases in the second language and be understood by a listener who speaks only the second language. This result is accomplished by displaying a source phrase in the first language on each display card, along with a target phrase that constitutes a translation of the source phrase in the second language. A phonetic transliteration of the target phrase is displayed in the first language. When the phonetic transliteration is read aloud by the speaker, the listener will hear, and therefore understand, the target phrase. The cards can be color-coded by subject matter, if desired. The display board contains a chamber that permits a number of display cards to be stored. The display board is constructed such that a number of similar boards can be connected to each other. This permits a number of display cards to be viewed simultaneously.

16 Claims, 3 Drawing Sheets

U.S. PATENT DOCUMENTS

| | | |
|---|---|---|
| 4,425,727 A | 1/1984 | Waldekrantz |
| 4,478,582 A | 10/1984 | Tucker |
| 4,604,820 A | 8/1986 | Edman |
| 4,637,153 A | 1/1987 | Kane et al. |
| 4,654,101 A | 3/1987 | Kane |
| 4,698,928 A | 10/1987 | Soporowski |
| 4,785,565 A | 11/1988 | Kuffner |
| 5,013,245 A | 5/1991 | Benedict |
| 5,090,145 A | 2/1992 | Chiang et al. |
| 5,203,706 A | 4/1993 | Zamir |
| 5,224,610 A | 7/1993 | Veazey |
| 5,230,175 A | 7/1993 | Follis |
| 5,249,383 A | 10/1993 | McCusker et al. |
| 5,276,598 A | 1/1994 | Hedenstrom et al. |
| 5,337,501 A | 8/1994 | Amanze |
| 5,525,060 A | 6/1996 | Loebner |
| 5,704,147 A | 1/1998 | Rellinger |
| 5,713,739 A | 2/1998 | Yu |
| 5,782,640 A | 7/1998 | Sandlin |
| 5,915,854 A | 6/1999 | Burke et al. |
| 6,024,571 A | 2/2000 | Renegar |
| 6,139,331 A | 10/2000 | Owen |

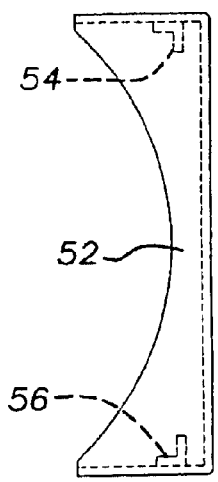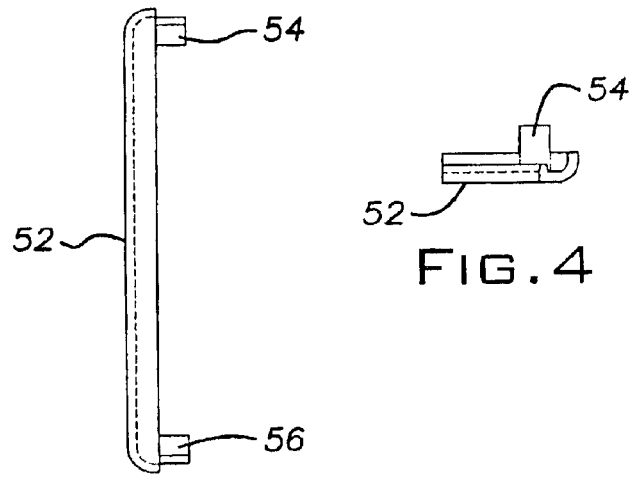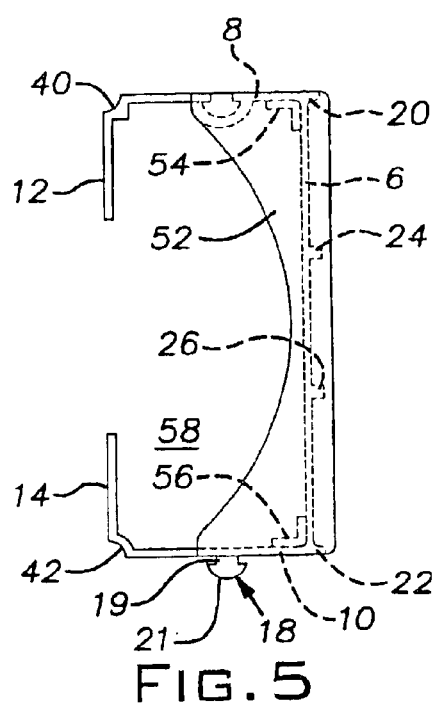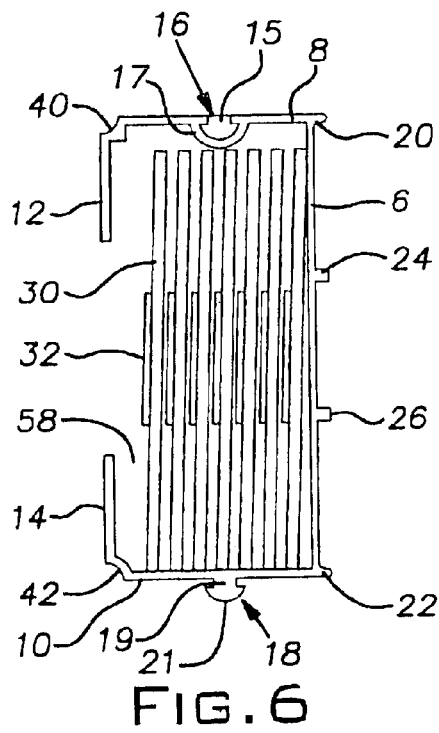

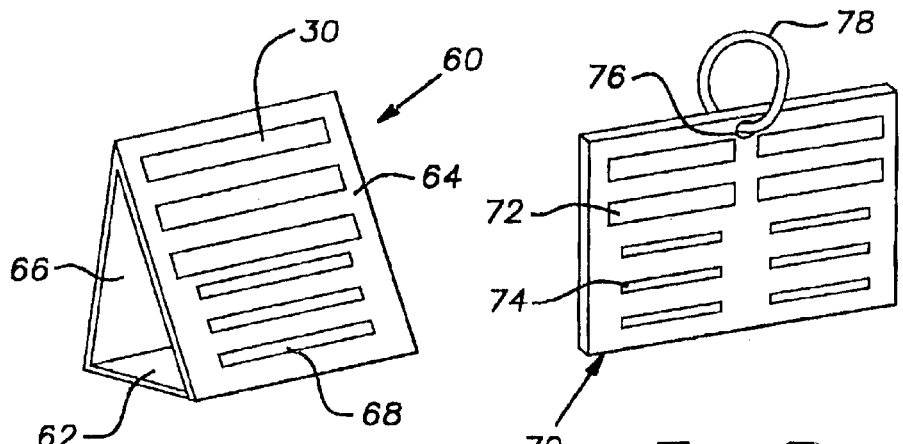
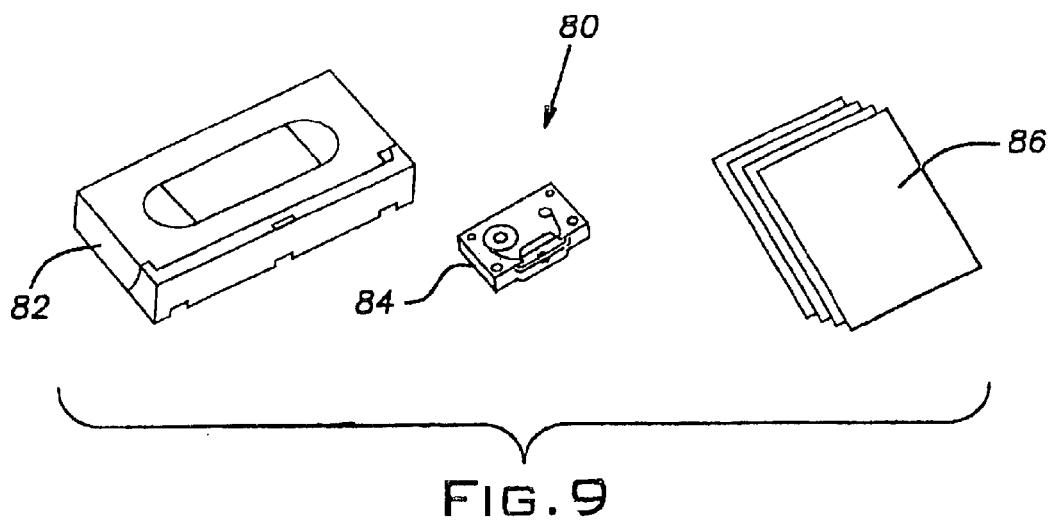

PHONETIC TRANSLITERATION CARD DISPLAY

CROSS REFERENCE TO RELATED APPLICATION

This application is a continuation of U.S. application Ser. No. 09/663,329, filed Sep. 18, 2000.

BACKGROUND OF THE INVENTION

1. Field of the Invention

The invention is directed to a technique for creating a bilingual environment wherein a person who speaks a first language can communicate easily with a person who speaks a second language.

2. Description of the Prior Art

In many hospitals, assisted-living facilities, long-term care facilities, factories, and other institutional settings, the staff and residents, or management and employees, speak different languages. This can create problems where staff or management need to communicate instructions or commands to residents or employees who speak a foreign language, and who therefore are not likely to understand the instruction or command.

In particular, in long-term care facilities, when the staff is unable to communicate with the residents, the latter often display behavior problems such as refusing to take medication or food. The inability of staff and residents to communicate with each other, if carried on long enough, results in a decreased quality of life for both parties. Additionally, the staff may be unable to perform certain tasks due to an inability to communicate with residents. In many instances, the staff may need both hands to care for the residents, precluding the use of hand-held devices that otherwise might assist in communication with the residents. Requiring the staff to learn a foreign language, or multiple foreign languages, in order to communicate with the residents is a burden on the staff and expensive for the institution.

Various attempts have been made to address the foregoing problems. In order to understand these attempts, certain terms must be defined. "Transcription" is the process of representing speech sounds by means of phonetic symbols. A common example is found in a dictionary where letters or pronunciation symbols enable the reader to properly pronounce each phrase. Unfortunately, transcription is useless in the context of enabling a person to pronounce foreign phrases that do not rely on an alphabet familiar to the person because the person is unlikely to understand the sounds that the letters or characters of the foreign alphabet represent. For example, the Russian language uses the Cyrillic alphabet. The word "hello" in the Russian language is "привет." A transcription of the word "привет" in Cyrillic would be useless to an English-only speaker intending to say "hello" to a Russian-only speaker because (1) the English-only speaker would not necessarily know what the Russian word for "hello" is, and (2) even if the Russian word were known, its transcription in Cyrillic would be ineffective as a pronunciation aid.

"Transliteration" is where characters of one alphabet are converted to the corresponding characters of another alphabet. For example, the Roman alphabet transliteration of the Russian word "спутник," which means "companion or satellite," is "sputnik." As with transcription, transliteration would not enable an English-only speaker to know that the Russian word "спутник" means "companion or satellite." However, once the English-only speaker knew what the word "спутник" means, he would be able to see its transliteration in the Roman alphabet and thereby make a passing attempt at proper pronunciation. A significant limitation of transliteration is that it is not effective for letters that do not have cognates in each alphabet. This problem is particularly acute for languages such as Hindi that employ a large number of characters in their alphabets, and languages such as Chinese that have a such a large number of characters that they do not have an alphabet for all practical purposes.

One approach to solving the foregoing problems is taught by the patent to Loebner, U.S. Pat. No. 5,525,060. Loebner discloses a multiple language learning aid in which two cards containing language information are joined such that various panels can be displayed. Words or characters in a first language are displayed on one panel, are translated in a second language on another panel, and are phonetically transliterated on another panel. The cards are difficult to manipulate, thereby precluding their use in any sort of on-going dialogue between persons who speak two different languages. Furthermore, the cards transliterate only individual words, not useful phrases or sentences. This shortcoming precludes the use of the cards for meaningful dialogue.

Another approach to the foregoing problems is taught by Cameron J. Camp, et al. in an article entitled "The InterpreCare System: Overcoming Language Barriers in Long-Term Care," The Gerontologist, Vol. 36, No. 6, pp. 321–23 (1996). The system of Camp et al. employs the concept of "phonetic transliteration." Phonetic transliteration is where a word or character in a first language is transliterated by letters or symbols in a second language so that a speaker of the second language can pronounce the character or word reasonably correctly. Using the example given previously for the Russian word for "hello" (привет), a phonetic transliteration in English would be "priv-ee-eht," with emphasis on the last syllable as indicated by bold italics. Thus, when this phonetic phrase is read aloud by an English-speaking person, a Russian-speaking person will hear the word "hello" in Russian. Camp et al. disclose the use of phonetic transliteration in the context of medical or institutional care, specifically in the use of common phrases, not just words, such as "Where is the pain?" (Which phonetically transliterates into Russian as "Good-yeh Boh-leet"). Although Camp et al. discuss ways in which their invention can be implemented, they do not provide details of the structure necessary to such implementation.

The patent to Patterson, U.S. Pat. No. 3,740,879, discloses a technique for recording patient medical data in which information strips are adhered removably to a rectangular sheet, and the patent to Burke et al., U.S. Pat. No. 5,915,854, discloses a diet or medicine management device in which a plurality of horizontal guide rails are adapted to receive slide members that can be moved horizontally relative to a legend that contains information about various foods. The patents to Mickey et al., U.S. Pat. No. 4,035,940; Edman, U.S. Pat. No. 4,604,820; and Follis, U.S. Pat. No. 5,230,175, disclose modular signs in which letters or panels can be removed and replaced by like letters or panels. None of these patents disclose a technique that would be suitable to implement a phonetic transliteration technique in a medical or institutional setting.

In view of the foregoing, there is a need for a technique that creates a multilingual environment for institutions such as long-term care facilities. Desirably, any such technique will reduce or wholly overcome some or all of the difficulties inherent in prior techniques such as foreign-language dictionaries and transliteration cards.

SUMMARY OF THE INVENTION

In response to the foregoing concerns, the present invention provides an environment in which people who speak different languages are able to communicate preselected phrases. As used herein, the word "phrase" is meant to include both single words and multiple words that communicate a thought. The present invention employs phonetic transliteration.

In accordance with the principles of the present invention, a display board and a plurality of display cards are provided. The display cards are secured detachably to the display board. In the preferred embodiment, each display card displays a source phrase in a first language, a target phrase in a second language, the target phrase constituting a translation of the source phrase in the second language, and a phonetic transliteration of the target phrase in the first language. By providing cards that are large enough to be read easily, and by providing cards that phonetically transliterate phrases of interest to those in a particular institution, the invention will enable persons who speak different languages to communicate effectively on a basic level.

From the foregoing description, it will be readily apparent to those skilled in the art that the present invention provides a significant advance. The present invention can help create a multilingual environment without the need for users to learn a second language, thereby providing numerous benefits to individuals who speak different languages. For example, both the staff and residents of institutions can reap benefits from the present invention almost immediately without the need to bring in outside experts or to train staff during working hours. Properly selected cards will permit the staff and residents to communicate effectively with each other. The present invention will reduce miscommunication between the residents and staff, improve the quality of life for both the residents and the staff, increase socialization among the residents and the staff, allow higher-functioning residents to speak English or other non-native language phrases, and create multilingual environments that currently do not exist. These and additional features and advantages of the invention disclosed herein will be further understood from a study of the description of the preferred embodiment that follows.

BRIEF DESCRIPTION OF THE DRAWINGS

FIG. 2 is an end view of and end cap of the display board of FIG. 1;

FIG. 3 is a front view of the end cap of FIG. 2;

FIG. 4 is a top view of the end cap of FIG. 2;

FIG. 5 is a side view of the display board of FIG. 1 with the end cap of FIG. 2 placed thereon;

FIG. 6 is an end view of the display board of FIG. 1 shown with a plurality of display cards stored within the display board;

FIG. 7 is a perspective view of an alternative embodiment of a display board of the present invention, shown with display cards secured to a front surface of the display board;

FIG. 8 is a perspective view of another alternative embodiment of a display board of the present invention, shown suspended from a ring and having a plurality of display cards secured to a front surface of the display board; and FIG. 9 is a perspective view of instructional materials for use in conjunction with the present invention.

Figure 1:
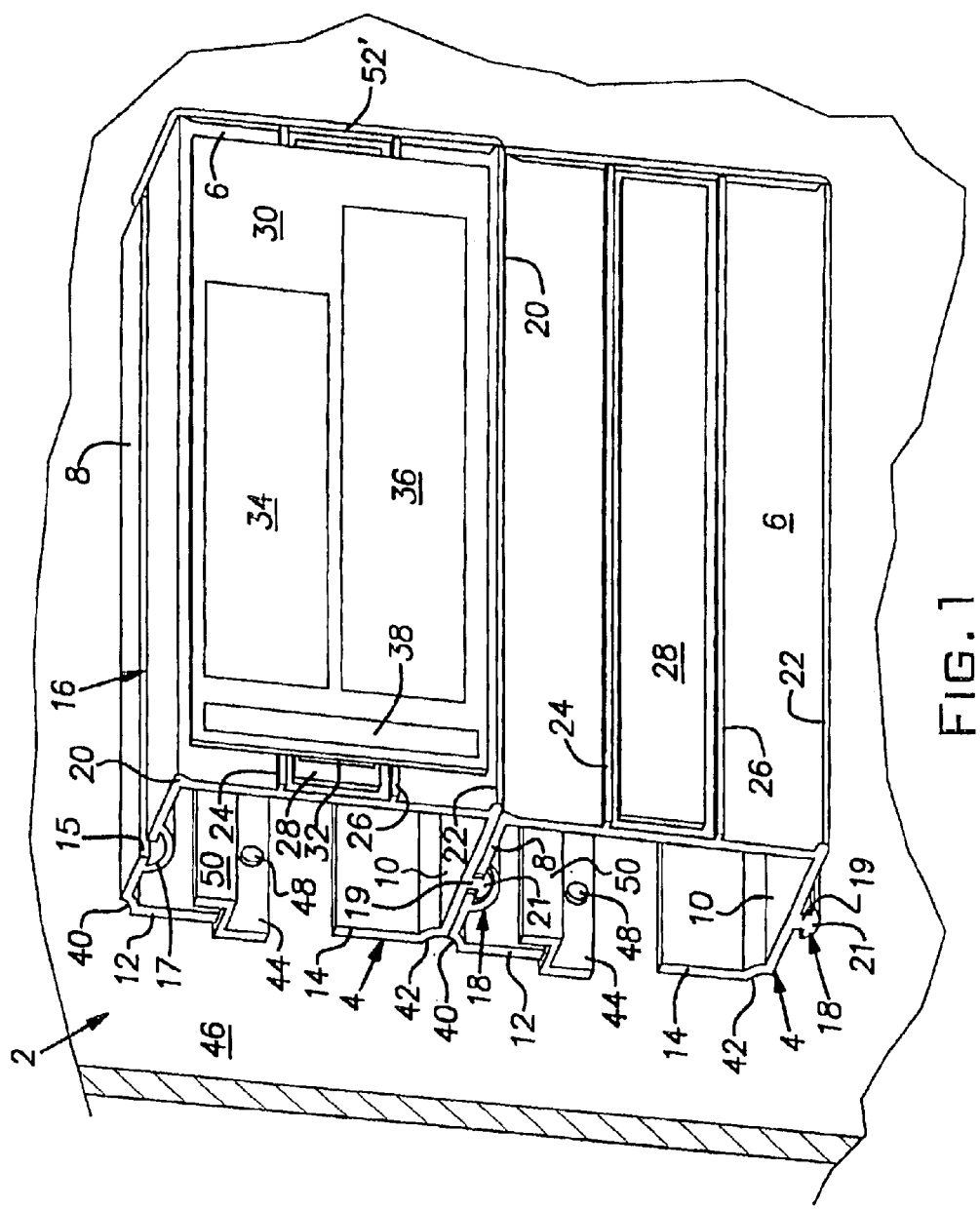
FIG. 1 is a perspective view of a first display board of the present invention having a display card secured thereto, and a second display board suspended from the first display board.

The FIGURES referred to above are not drawn necessarily to scale and should be understood to present a representation of the invention, illustrative of the principles involved. Some features of the multilingual devices depicted in the drawings have been enlarged or distorted relative to others to facilitate explanation and understanding. The same reference numbers are used in the drawings for similar or identical components and features shown in various alternative embodiments. Multilingual devices as disclosed herein will have configurations and components determined, in part by the intended application and environment in which they are to be used.

DESCRIPTION OF THE PREFERRED EMBODIMENTS

As shown in FIG. 1, a multilingual device 2 in accordance with the present invention comprises one or more display boards 4. Each display board 4 has a substantially C-shaped profile and is formed of a front wall 6, a top wall 8, a bottom wall 10, a rear upper flange 12 and a rear lower flange 14. A first connector in the form of a slot 16 in the illustrated embodiment extends along the length of the top wall 8. A second connector in the form of a protrusion 18 in the illustrated embodiment extends along the length of the bottom wall 10.

The slot 16 is defined by laterally extending ledges 15 and a semi-circular shoulder 17 secured to an under surface of the top wall 8 such that groove 16 has a substantially mushroom-shaped cross-section. The protrusion 18 is formed of a straight-sided rib 19 extending downwardly from bottom wall 10 and a semi-circular formation 21 at the end of rib 19. The configuration of the rib 19 and the formation 21 are such that the protrusion 18 has a substantially mushroom-shaped cross-section. Consequently, the groove 16 and the protrusion 18 have complementary shapes. This construction enables a protrusion 18 of a first display board 4 to interlock with a groove 16 of a second display board 4, as seen in FIG. 1, in order that the second display board 4 can be suspended from the first display board 4. In this manner, a number of display boards 4 may be connected vertically to increase the useful size of the multilingual device 2.

A first rib 20 extends laterally along an upper edge of front wall 6, and a second rib 22 extends laterally along a lower edge of front wall 6. Third and fourth ribs 24, 26 project from, and extend laterally along, front wall 6. The ribs 24, 26 are disposed intermediate the first and second ribs 20, 22. Each of the first, second, third, and fourth ribs 20, 22, 24, 26 are substantially parallel to one another. A fastener 28 is secured to the front wall 6 between third and fourth ribs 24, 26. Preferably, the fastener 28 is a strip of magnetic material; however, other suitable fasteners, including hook and loop fasteners, can be used.

A rectangular display card 30 has a fastener 32 secured to its rear surface. In a preferred embodiment, fastener 32 is a strip of magnetic material with a pole opposite to that of the fastener 28 such that the display card 30 can be secured to the display board 4. The ribs 20, 22 are spaced slightly further apart than the width of the display card 30. The ribs 20, 22 thus serve to locate the display card 30 vertically in the center of the display board 4.

A source phrase 34, a transliterated phrase 36, and a target phrase 38 are displayed on the front surface of the card 30. The source phrase 34 is in a first or source language of a first user of the multilingual device 2. The source phrase 34 can be one of numerous phrases in a selected language. For example, where the first user speaks English, the source phrase 34 could be the word "hello."

The target phrase 38 is a translation of the source phrase 34 in a second or target language of a second user of the multilingual device 2. The transliterated phrase 36 is a phonetic pronunciation of the target phrase 38 in the first language. If, for example, the target language is Russian and the source phrase is "hello," the transliterated phrase 36 is "*priv*-ee-*eht*." The bold and italics designates to the first user that the emphasis is to be placed on that particular syllable. Accordingly, a first user of multilingual device 2, who speaks only English, will be able to say the phrase "hello" to a second user, who speaks only Russian, such that the second user hears the corresponding phrase in the Russian language. Thus, a first user, who knows only a first language, can communicate in a second language, which he does not know at all, to a second user who speaks only the second language.

As indicated above, the target phrase 38 is the translation of the source phrase 34 in the target language. Thus, in the example given, the target phrase 38 is "Привет," the Russian word corresponding to "hello." By providing the target phrase 38, the second user is able to see, in his native language, the word being spoken by the first user, which helps to ensure that the source phrase is correctly communicated by the first user to the second user.

A second example of a source phrase in English is "good morning." The corresponding transliterated phrase 36 is "*doh*-broh-yeh Oo-*trah*," with the emphasis on the first and fourth syllables. The corresponding target phrase 38 in Russian is "Доброеутро."

The device 2 can also be used in the reverse order, such that the second user can communicate with the first user. To do so, the second user retrieves a display card 30 having displayed thereon a desired source phrase 34 in the user's native language and a corresponding source phonetic phrase 36, which, when read aloud, will sound to the first user like the corresponding target phrase in the native language of the first user. Thus, for any desired source language and any desired target language, display device 2 can provide the ability for a first user and a second user, who speak only the source and target languages, respectively, to communicate with one another.

In the embodiment described above, a bilingual environment is created. It is to be appreciated that the display cards 30 on display board 4 can be phonetic transliterations of one phrase into multiple languages. That is, a first display card 30 may display the phonetic transliteration of a source phrase to a second language, and a second display card 30 may display the phonetic transliteration of the same source phrase into yet additional languages. Thus, a user speaking a first language can communicate the same message to multiple listeners, each of whom speaks a different language than the first user and different from one another.

Display cards 30 may have different lengths, depending on the length of the phrases displayed thereon. For example, certain display cards 30 may have a length equal to the length of the display board 4 to display longer phrases. Other display cards 30 may have a length equal to half of the length of the display board 4 to display shorter phrases. Where a shorter display card 30 is used, two of such cards 30 may be displayed side-by-side in order to fill the available space on the display board 4.

In a preferred embodiment, a notch 40 is formed at an upper edge of upper rear flange 12, and a notch 42 is formed at a lower edge of lower rear flange 14. Notches 40 and 42 receive a corresponding first rib 20 and a second rib 22, respectively, of a second display board 4 when two display boards are stacked in a nesting fashion, thus saving shipping or storage space.

A bracket 44 is secured to a wall 46, or other surface, by fasteners 48 (only one of which is visible), such as screws, lag bolts, or other suitable fasteners. An upwardly extending flange 50 is formed on the bracket 44. The upper rear flange 12 of the display board 4 is received by the flange 50 such that the bracket 44 supports the display board 4 on the wall 46. Consequently, a number of the display boards 4 can be mounted on the wall of a room, such as a resident's room in a long-term care facility.

As seen in FIGS. 2–4, an end cap 52 may be provided for use on either end of the display board 4. An upper rib 54 and a lower rib 56 extend outwardly from the end cap 52. The upper rib 54 and the lower rib 56 preferably have an L-shaped profile. Since, in the illustrated embodiment, the end cap 52 is configured to fit onto the left end of the display board 4 shown in FIG. 1, the upper and lower ribs 54, 56 protrude from the right side of the end cap 52. A corresponding end cap 52' which has upper and lower ribs 54', 56' protruding from its left side is fitted onto the display board 4 as shown in FIG. 1. When the end cap 52 is connected to the display board 4, as shown in FIG. 5, the upper rib 54 abuts the corner formed by the front wall 6 and the top wall 8. Similarly, the lower rib 56 abuts the corner formed by the front wall 6 and the bottom wall 10. The end cap 52 enhances the aesthetics of the display board 4 and minimizes the possibility of sharp edges. The display board 4 and the end caps 52, 52' may be formed of plastic, wood, or metal.

As seen in FIG. 6, a plurality of display cards 30 may be stored within a chamber 58 defined by the front wall 6, the top and bottom walls 8, 10, and the rear flanges 12, 14. A number of display cards 30 can be placed within the chamber 58. Access to the chamber 58 can had from either end of the chamber 58.

In the preferred embodiment, the display board 4 is made of a plastics material such as ABS. Preferably, the display board 4 is formed in an extrusion operation or a molding operation. Although the dimensions of the display board 4 can be varied, it is expected that the chamber 58 will be about 3.0 inches high and about 1.1 inches wide. The wall thickness of the display board 4 is about 0.062 inch, and the length of the display board is about 20 inches. It is expected that five display boards 4 will be connected together to form a section 15 inches high by 20 inches wide. Four sections typically would be used in a given room—two sections connected vertically and another two connected vertically. The four sections can be disposed adjacent each other to form a rectangular array having approximate overall dimensions of 30 inches high by 40 inches wide. When assembled in this manner, 20 full-size display cards 30 can be used simultaneously, or up to 40 half-size display cards 30 can be used simultaneously.

In the preferred embodiment, the display cards 30 are color-coded to aid in the communication process. Groups of display cards 30 having phrases that are associated with one another have the same color background on the card. For example, medical phrases such as "Time for your medicine" and "Where does it hurt?," would have a first background color and would be displayed together on a first section of display boards 4; food-related statements such as "water," "rice," and "salt" would have a second background color and would be displayed together on a second section of display boards 4; salutations such as "How are you?" and "Good morning" would have a third background color and would be displayed together on a third section of display boards 4; and commands such as "Please sit down" would have a fourth background color and would be displayed together on a fourth section of display boards 4.

Another embodiment of a display board 60 is shown in FIG. 7. Display board 60 has a triangular profile and is formed of a bottom wall 62, a front wall 64, and a rear wall 66. A plurality of fasteners 68 are secured to the front wall 64. A plurality of display cards 30 can be secured to the display board 60, as described above with reference to the display board 4. The display board 60 is portable, and is suitable, for example, for use on a tabletop or countertop.

Another embodiment of a display board 70 is shown in FIG. 8. The display board 70 is a small rectangular panel approximately the size of a 3-inch by 5-inch card, having small display cards 72 secured thereto by fasteners 74. The display board 70 is small enough that one or more can be hand-carried by a user and, in fact, may even be carried in a pocket, making them very portable and convenient. In another embodiment, the display board 70 may have an aperture 76 through which a ring 78 may extend. Ring 78 in turn can be suspended from a key chain, lanyard, or other suitable device, thereby enhancing the portability of the display board 70.

Typical instructional materials 80 are shown in FIG. 9. The instructional materials 80 include videotapes 82, audio cassette tapes 84, and written materials 86. The written materials 86 may include written instructions and quizzes to test learning. The instructional materials 80 can be employed by users or instructors in order to facilitate the use of the multilingual device 2. The instructional materials 80 provide training, for example, in the pronunciation of the transliterated phrases 36.

In light of the foregoing disclosure of the invention and description of the preferred embodiment, those skilled in this area of technology will readily understand that various modifications and adaptions can be made without departing from the spirit and scope of the present invention. All such modifications and adaptions are intended to be covered by the following claims.

What is claimed is:

1. A method of enabling a first person who speaks a first language to communicate with a second person who speaks a second language but not the first language, comprising:

providing a phonetic transliteration card display that includes a plurality of display cards and a display card holder, the display card holder being configured to support at least one of the plurality of display cards, each display card having a background color that corresponds to a particular subject or category and further having displayed thereon a plurality of phrases that relate to a single subject or idea, the plurality of phrases including:

a source phrase in the first language, the source phrase being located predominantly in a upper, central portion of the display card and being associated with the background color;

a target phrase in the second language, the target phrase being a translation of the source phrase in the second language, the target phrase being spaced from the source phrase; and a phonetic transliteration of the target phrase in the first language, the phonetic transliteration being located proximate to the source phrase;

identifying by the first person a phrase or idea to be communicated to the second person;

selecting by the first person a display card from the plurality of display cards that has a source phrase that corresponds to the identified phrase or idea; and verbalizing by the first person the phonetic transliteration on the selected display card, whereby the first person who speaks the first language communicates the identified phrase or idea to the second person who does not speak the first language.

2. The method as defined in claim 1, wherein the plurality of display cards is one of several such pluralities, each of the several such pluralities being colored differently from each other and each of the colors uniquely identifying a category of source phrases, and the categories of source phrases for each of the pluralities of display cards differ from each other of the several such pluralities, and wherein the step of selecting comprises determining the category of a desired source phase and selecting one of the several such pluralities of display cards based on the uniquely identifying color of the category corresponding to the desired source phrase.

3. The method as defined in claim 1, wherein the display card holder is one of a plurality of display card holders, and each of said display card holders has a fastener portion configured to secure to a corresponding fastener portion of another one of the display card holders, the method further comprising securing together two or more of fastener portions to thereby link together the display card holders corresponding to the two or more fastener portions and thereby forming a series of linked display card holders.

4. The method as defined in claim 3, further comprising orienting the linked display card holders such that front sides of each of the linked display card holders faces in a direction different from each of the other of the linked display card holders, whereby the first and second persons can each view a respective display card front side at a corresponding differing angle relative to each other.

5. The method as defined in claim 4, further comprising responding by the second person to the verbalizing of the transliteration phrase by the first person, the step of responding by the second person comprising:

identifying by the second person a second display card holder from the series of linked display card holders, the second display card holder having mounted thereon a second, different display card having a second, different source phrase, the second source phrase corresponding to a desired response by the second person to the transliteration phrase verbalized by the first person;

associating by the second person the second source phrase to a corresponding second transliteration phrase; and verbalizing by the second person the second transliteration phrase.

6. The method as defined in claim 1, further comprising reviewing by the second person of the target phrase corresponding to the transliteration phrase verbalized by the first person to ensure that the verbalized transliteration phase by the first person was correct.

7. A method of communicating by a first person who speaks a first language with a second person who speaks a second, different language but does not speak the first language, comprising:

providing a phonetic transliteration card display that includes a plurality of colored display cards and a display card holder, the display card holder being configured to support at least one of the plurality of colored display cards, each colored display card having displayed thereon a color corresponding to a respective predetermined category, and the display card further having displayed thereon a plurality of phrases that relate to a single subject or idea corresponding to the display card color, the plurality of phrases including:

a source phrase in the first language, the source phrase being located predominantly in a upper, central portion of the display card;

a target phrase in the second language, the target phrase being a translation of the source phrase in the second language, the target phrase being spaced from the source phrase; and a phonetic transliteration of the target phrase in the first language, the phonetic transliteration being located proximate to the source phrase;

identifying by the first person a phrase or idea to be communicated to the second person;

selecting by the first person a display card from the plurality of display cards that has a source phrase that corresponds to the identified phrase or idea; and verbalizing by the first person the phonetic transliteration on the selected display card, thereby the first person who speaks the first language communicates the identified phrase or idea to the second person who does not speak the first language.

8. The method as defined in claim 7, wherein the step of selecting comprises determining the category of a desired source phase based on the display card color.

9. The method as defined in claim 7, further comprising reviewing by the second person the target phrase verbalized by the first person to ensure that the verbalized transliteration phase was correct.

10. The method as defined in claim 7, wherein the card display is one of a plurality of like card displays, and each of said card displays has a fastener configured to secure to a fastener on another one of the card displays, the method further comprising securing together two or more of the plurality of card displays.

11. The method as defined in claim 10, further comprising orienting the secured card displays such that front sides of each of the secured card displays faces in a direction different from each other, whereby the first and second persons can each view a respective differing display card mounted to the front side of differing ones of the plurality of card displays at a corresponding differing angle relative to each other.

12. A phonetic transliteration card display for communicating by a first person who speaks a first language with a second person who speaks a second, different language, comprising:

a display board and a plurality of display cards, each of the plurality of display cards being operable to secure detachably to the display board, the plurality of display cards having a background color that identifies the plurality of display cards as belonging to, and corresponding with, a predetermined category, each of the display cards having displayed on a single surface thereof a plurality of phrases, wherein the plurality of phases differ from each other and include:

a source phrase in the first language forming a single complete thought or idea and being associated with the background color, the source phrase being located predominantly in an upper, central portion of the display board;

a target phrase in the second language, the target phrase constituting a translation of the source phrase in the second language, the target phrase being located to one side of the source phrase, and is spatially horizontally associated with the source phrase; and a phonetic transliteration phrase of the target phrase in the first language, the transliteration phrase being located beneath the source phrase, and the transliteration phrase is spatially vertically associated with the source phrase; and thereby the first person can select one of the plurality of display cards based on the background color, secure detachably the selected display card to the display board, and verbalize the transliteration phrase displayed on the selected display card phonetically correctly while viewing the selected display card surface.

13. The card display as defined in claim 12, wherein the display board and each one of the plurality of display cards have respective portions of a fastener system that facilitates the detachable securing of each display card to the display board, and the fastener system is selected from the group consisting of hook and loop, and magnet/magnetic, and the display board has an inner surface defining a cavity and is configured to receive and store the plurality of display cards, and the plurality of display cards are sized and shaped to be stored securely in the display board cavity.

14. The card display as defined in claim 12, wherein the target phrase is disposed on the display card surface so as to be viewed simultaneously by the first and second persons to ensure that the verbalized phonetic transliteration phase by the first person is correct.

15. The card display as defined in claim 12, wherein the display board is one of a plurality of like display boards, and each of said display boards has a fastener portion configured to secure to a fastener portion on another one of the display boards, and the plurality of display cards is one of several pluralities of display cards, each of several pluralities belonging to a differing category and having a correspondingly differing background color.

16. The card display as defined in claim 15, wherein each of the plurality of display boards is operable to be securedly reoriented relative to another of the plurality of display boards such that front sides of each of the secured display boards faces in a direction different from each other, whereby the first and second persons can each view a respective one of the display cards mounted on a corresponding one of the display boards at a corresponding differing angle relative to each other of the persons.

* * * * *